(12) United States Patent
Huang et al.

(10) Patent No.: US 9,148,669 B2
(45) Date of Patent: Sep. 29, 2015

(54) HIGH PERFORMANCE AVC ENCODER ON A MULTI-CORE PLATFORM

(75) Inventors: Jonathan Huang, Cupertino, CA (US); Tsaifa Yu, Milpitas, CA (US)

(73) Assignee: Sony Corporation, Tokyo (JP)

( * ) Notice: Subject to any disclaimer, the term of this patent is extended or adjusted under 35 U.S.C. 154(b) by 935 days.

(21) Appl. No.: 13/045,436

(22) Filed: Mar. 10, 2011

(65) Prior Publication Data

US 2012/0230391 A1    Sep. 13, 2012

(51) Int. Cl.
*H04N 7/12* (2006.01)
*H04N 19/436* (2014.01)
*H04N 19/503* (2014.01)
*H04N 19/177* (2014.01)

(52) U.S. Cl.
CPC ............ *H04N 19/436* (2014.11); *H04N 19/177* (2014.11); *H04N 19/503* (2014.11)

(58) Field of Classification Search
CPC .. H04N 19/177; H04N 19/436; H04N 19/503
USPC .......................... 375/240.02, 240.03; 719/149
See application file for complete search history.

(56) References Cited

U.S. PATENT DOCUMENTS

| | | | | |
|---|---|---|---|---|
| 8,341,611 B2* | 12/2012 | Munshi et al. | ................ | 717/149 |
| 2001/0014123 A1* | 8/2001 | Strasman et al. | ........ | 375/240.13 |
| 2008/0137736 A1* | 6/2008 | Richardson et al. | ..... | 375/240.03 |
| 2011/0305273 A1* | 12/2011 | He et al. | ................... | 375/240.02 |

* cited by examiner

*Primary Examiner* — Jessica M Prince
(74) *Attorney, Agent, or Firm* — Haverstock & Owens LLP

(57) ABSTRACT

A method and system for encoding a digital video signal using a plurality of parallel processors. A digital picture is received that is composed of one or more GOPs. The CPU then determines the number of GOPs that need to be encoded and divides them into groups. The number of GOPs in a group may equal the number of parallel processors in the multi-core platform available to encode. The CPU transfers in a single batch to the multi-core platform, a frame of equal rank from each GOP contained in the first group. The multi-core platform encodes the frames in parallel, rearranges the encoded byte stream chunk into normal display order sequence and stores the encoded byte stream. The process may repeat until all the GOPs in the first group have been encoded. Upon completion the multi-core platform outputs the encoded byte stream in normal display order sequence.

12 Claims, 3 Drawing Sheets

HIGH PERFORMANCE AVC ENCODER ON A MULTI-CORE PLATFORM

TECHNICAL FIELD

The present disclosure relates to the field of video compression. More specifically, the present disclosure relates to methods and systems for performing video compression utilizing parallel processors.

BACKGROUND

In order to efficiently store and transmit digital video signals, it is often desired to "compress" the signals. H.264 Advanced Video Coding (AVC) is a video compression standard that achieves higher compression efficiency than most signal compression standards. The AVC standard provides good video quality at bit rates that are substantially lower than previous standards, such as MPEG-2, H.263, or MPEG-4 Part 2, without being impractical to implement. The AVC standard is also flexible enough to be applied to a wide variety of applications and work well on a very wide variety of networks and systems.

The coding efficiency gains of advanced video standards such as AVC come at the price of increased computational requirements. The demand for computing power also increases with the shift towards HD resolutions. As a result, current high-performance uniprocessor computer architectures are not capable of providing the performance required for real-time processing. One way to speed up the video encoding processes is to use a multi-core architecture. Moreover, another powerful solution is to exploit parallelism. AVC may be parallelized either by a task-level or data-level decomposition.

In order to exploit parallel processing power in video compression applications, conventional methods involve splitting a picture in a video sequence into "slices." Some video compression applications require a single-slice approach (one slice per picture). With the single-slice approach, there are many dependency issues in the syntax and semantics around the block boundary, especially in the AVC specification.

One method of parallel processing video compression on a multi-core system with the single-slice approach is to separate a picture horizontally into a top half and a bottom half, further separating the picture into Macroblocks (MBs). One thread in the processor processes the top half of the picture and another thread processes the bottom half. Both threads process the same picture. The bottom thread ignores dependency around the boundary and also handles conformance of syntax around the boundary. When the bottom thread processes the first lines in an MB of the picture, it selects an MB mode that is independent of mode used for its upper MB. However, this methodology may achieve lower efficiency of compression than the standard single-slice raster scan approach.

A multiple-slice approach has been proposed. However, multi-slice methods may suffer from many problems. For example, it may be difficult or impossible to validate the correctness of parallel-processing methodology incorporating multi-slices. In addition, the video quality decreases at the boundaries of slices. Video compression using horizontal multi-slice encoding may suffer workload imbalance if the complexity of video contents are different in different slices. Moreover, the result of individual slices of horizontal multi-slice encoding needs to be concatenated to form a single result. This is additional work that does not exist in single-slice encoding.

All of the processes discussed above divide a frame into slices for encoding. If a system could pass an entire frame, rather than a slice, to a multi-core encoder, it would greatly reduce the communication load between the central processor and encoder. Additionally, the communication load would be further reduced if the encoding process occurred in a single-command multiple-data fashion. Hence, there remains a need for an efficient implementation and scalable methodology for processing, in parallel, groups of pictures (GOPs) at the frame level where each frame is an encoding unit.

SUMMARY

In at least one embodiment, a method of generating a compressed video signal is performed in an encoding system comprising a central processing unit (CPU), a host memory, and a multi-core platform comprising a plurality of parallel processor units. An exemplary the method comprises receiving an input digital video signal comprising a plurality of GOPs each comprising one or more frames; determining, by the CPU, a number of GOPs to encode; dividing the GOPs to be encoded into one or more groups based on a number of the parallel processor units; assigning ranks to the frames in the GOPs; comparing arguments of an encoding command for frames of equal rank within a group of the one or more groups; if the arguments are different from one another, transferring the arguments and the frames of equal rank to the multi-core platform; encoding the transferred frames in parallel by the parallel processor units, creating encoded byte stream chunks; re-arranging the encoded byte stream chunks in an output buffer in display order sequence to create an encoded byte stream; and outputting the encoded byte stream.

In some embodiments, the exemplary methods may be implemented by instructions stored on a non-transitory computer-readable storage medium which, when executed in an encoding system comprising a central processing unit (CPU), a host memory, and a multi-core platform comprising a plurality of parallel processor units, cause the encoding system to perform the exemplary methods.

Further described herein are systems for encoding a digital video signal, comprising a host memory, configured to receive the digital video signal, wherein the digital video signal comprises a plurality of GOPs and the GOPs comprise one or more frames; a central processing unit, configured to: divide the GOPs to be encoded into one or more groups, compare arguments of an encoding command, for frames of equal rank within a group of the one or more groups, if the compared arguments have the same value, transfer, a single argument and at least one of the frames of equal rank within the group, and if the compared arguments have different values, transfer, the arguments and the frames of equal rank within the group; and a multi-core platform comprising: a plurality of parallel processor units configured to: receive, from the central processing unit, frames of equal rank from the group and at least one argument, if only a single argument is received, provide the single argument to each of the of parallel processor units, encode the frames in parallel, creating encoded byte stream chunks, arrange the encoded byte stream chunks in display order sequence to create an encoded byte stream, and output the encoded byte stream; and a multi-core platform memory, configured to store frames transferred from the central processing unit, and further configured to store encoded byte stream chunks.

The accompanying drawings, which are incorporated in and constitute a part of this specification, illustrate exemplary embodiments and together with the description, serve to explain the principles of the claimed inventions.

It is to be understood that both the foregoing general description and the following detailed description are exemplary and explanatory only and are not restrictive of the inventions, as claimed.

BRIEF DESCRIPTION OF THE DRAWINGS

The accompanying drawings, which are incorporated in and constitute a part of this specification, illustrate exemplary embodiments and, together with the description, serve to explain the principles of the disclosure. In the drawings.

DESCRIPTION OF THE EMBODIMENTS

Figure 1:
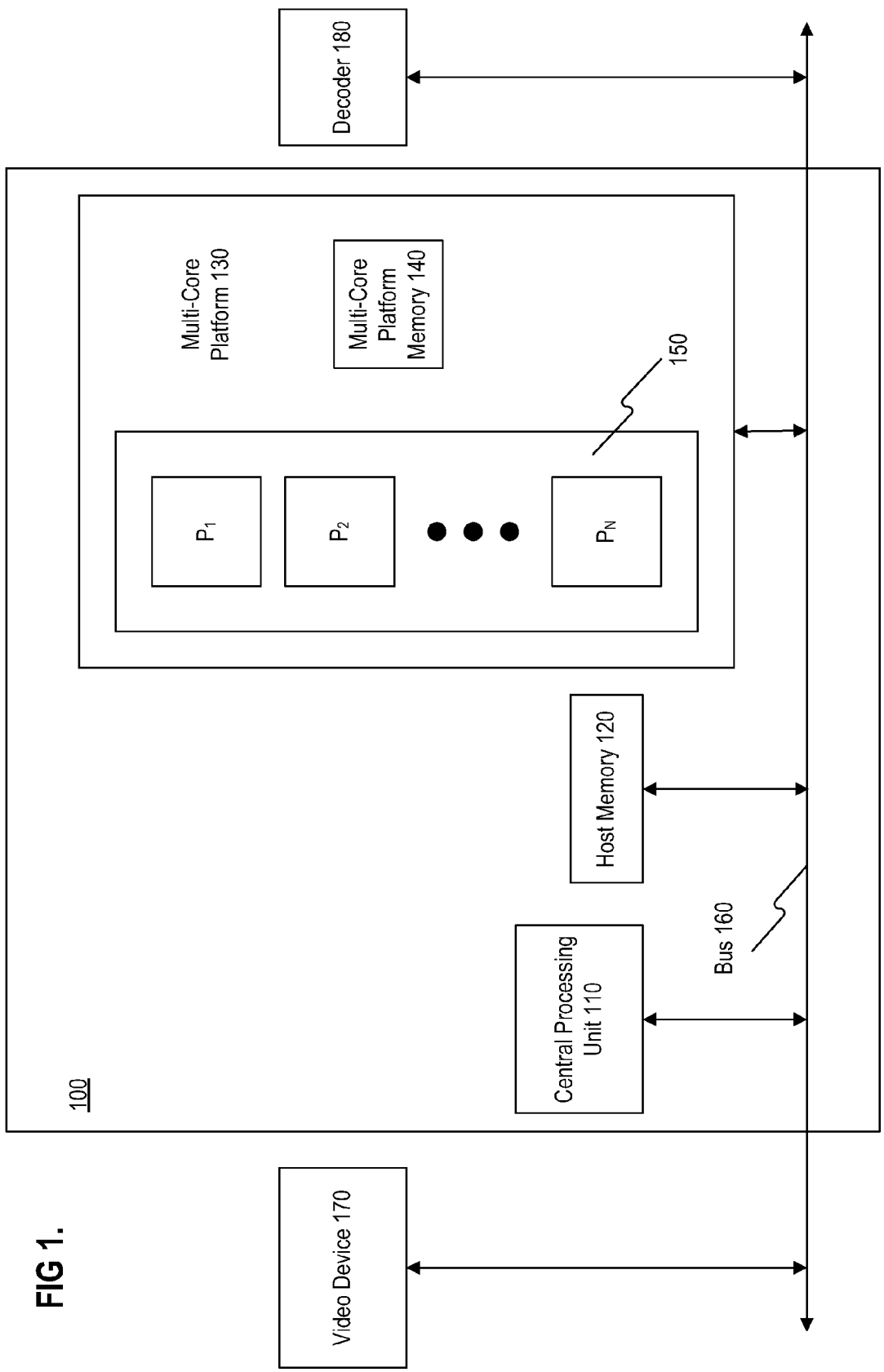
FIG. 1 is a block diagram of an exemplary AVC multi-core computer system.

The following description refers to the accompanying drawings. Wherever possible, the same reference numbers will be used throughout the drawings to refer to the same or similar parts. While several exemplary embodiments and features of the inventions are described herein, modifications, adaptations and other implementations are possible without departing from the spirit and scope of the inventions. For example, substitutions, additions or modifications may be made to the components illustrated in the drawings, and the exemplary methods described herein may be modified by substituting, reordering, or adding steps to the disclosed methods. Accordingly, the following detailed description in non-limiting and the proper scope of the inventions is defined by the appended claims.

As used herein, the term "digital video signal" includes a digital signal composed of one or more groups of pictures (GOPs), the GOPs being composed of one or more frames or pictures.

In the present disclosure, methods and systems for performing video compression using parallel processors are disclosed. FIG. 1 is a block diagram of an exemplary embodiment of an AVC encoding system for implementing methods described herein. As shown in exemplary FIG. 1, the AVC encoding system 100 comprises a central processing unit (CPU) 110, a host memory 120, and the multi-core platform (MCP) 130. In some embodiments, system 100 may be operatively coupled (such as communicatively coupled using optical, electrical, or wireless transmission) to a video device 170 and a decoder 180. Although the exemplary system of FIG. 1 is shown with a single CPU, the principles of the claimed invention may be implemented on systems with multiple CPUs. The AVC encoding system 100 may be operated in association with, for example, a camera, a computer system, or any other device capable of receiving, capturing, transmitting, or rendering a video signal.

Video device 170, may be the output circuit of a digital camera or other device whose output is a digitized video signal. The video device 170 may be operatively coupled to CPU 110, host memory 120, MCP 130, and the decoder 180 via bus 160.

Instructions executed by CPU 110 may, for example, be pre-loaded into the processor or may be stored in separate computer-readable host memory 120 or other separate storage device (not shown), such as a random access memory (RAM), a read-only memory (ROM), a hard disk, an optical disk, a magnetic medium, a flash memory, other permanent memory, other volatile memory, or any other tangible mechanism capable of providing instructions to the processor.

As depicted in FIG. 1, CPU 110 may be operatively coupled to the host memory 120, the MCP 130, the video device 170, and the decoder 180. For example, in some embodiments the operative coupling may be via a system bus 160. CPU 110 may be configured to execute instructions that regulate one or more of these components. For example, CPU 110 may be configured to divide a digital video signal into GOPs. As depicted in FIG. 1, CPU 110 is all or part of a CPU. Additionally, in some embodiments, CPU 110 may be one or more integrated circuits, microchips, microcontrollers, microprocessors, embedded processor, graphics processing unit (GPU), digital signal processors (DSP), field-programmable gate array (FPGA), or other circuit suitable for executing instructions or performing logic operations, or some combination thereof.

Host memory 120 may be volatile (e.g., SRAM, DRAM, or other semiconductor memory) or non-volatile (e.g., harddisk, RAN optical disk, flash drive). Host memory 120 is operatively coupled to the CPU 110, the MCP 130, the video device 170, and the decoder 180. Additionally, in some embodiments some of host memory 120 may be mapped into an effective address space of an MCP Memory 140, making the same memory visible to both the CPU 110 and the MCP 130, reducing the need to copy from one memory to another for the data to be used by both.

MCP 130 is a conventional multi-core platform processing device comprising multiple processing units (or cores), generally in a single physical package such as an integrated die. As with single-processor devices, cores in multi-core devices may implement architectures like superscalar, VLIW, vector processing, SIMD, or multithreading. The various cores on a multicore platform may share on- or off-chip cache.

As shown in FIG. 1, MCP 130 includes a plurality of processor cores 150, labeled $P_1$ to $P_N$, and MCP memory 140. The processing cores 150 may, for example, include a plurality of integrated circuits, microchips, microcontrollers, microprocessors, embedded processors, all or part of CPUs, graphics processing units (GPUs), digital signal processors (DSPs), field-programmable gate arrays (FPGAs), or other circuits suitable for executing instructions or performing logic operations, or some combination thereof.

Each of the plurality of processor cores 150 may have a parallel data cache, or shared MCP memory 140, that is shared by all the processors within the MCP 130. MCP memory 140 is a low-latency memory and may be located near each processor core to further reduce latency. MCP memory 140 allows the processor cores 150 to share data without the need to pass data outside the chip to the generally much slower host memory 120. Use of the embedded MCP memory 140 in the MCP 130 reduces the number of external memory accesses. MCP memory 140 may be part of the same package as the MCP 130. Additionally, in some embodiments (not pictured), the MCP memory 140 can simply be a subset of host memory 120. In some embodiments (not pictured), MCP memory 140 may be a subset of some other memory that is connected to the plurality of processor cores 150.

In some devices, each of the processor cores 150 may have one or more local caches (not pictured), such as the L1/L2 caches currently available on devices of compute capability 2.0. Local cache may be used, for example, to service operations such as load, store, and texture, and can be used to facilitate high-speed data sharing across the MCP 130. In some devices, on-chip memory may be configurable, such that on-chip memory may be allocated between local cache (not pictured) and shared MCP memory 140.

MCP 130 may be any available multi-processor platform. Exemplary GPU-based multi-core platforms include the INTEL Knight Ferry, NVIDIA GeForce GTX 480, and the CPU based multicore platform include INTEL 17 (4 core), INTEL Sandy Bridge (6 core), INTEL Gulftown (6 core), and AMD Phenom platforms.

In at least one embodiment, the encoded digital video signal is provided to a decoder 180, for decoding. Decoder 180 may be operatively coupled to a device (not pictured) for display of the decoded video signal. Additionally, in some embodiments the encoded digital video signal may be provided to communication channels (not pictured) to be transmitted, or to storages to be recorded (not pictured).

The methods described herein are scalable. Therefore, use of MCPs with more core processors and/or more on-chip memory may be used to obtain better performance. Moreover, the described methods may be operable in many different working environments ranging from low-end applications, such as handheld devices and laptops, to high-end applications such as GPU servers.

Method for Encoding Digital Data

Figure 2:
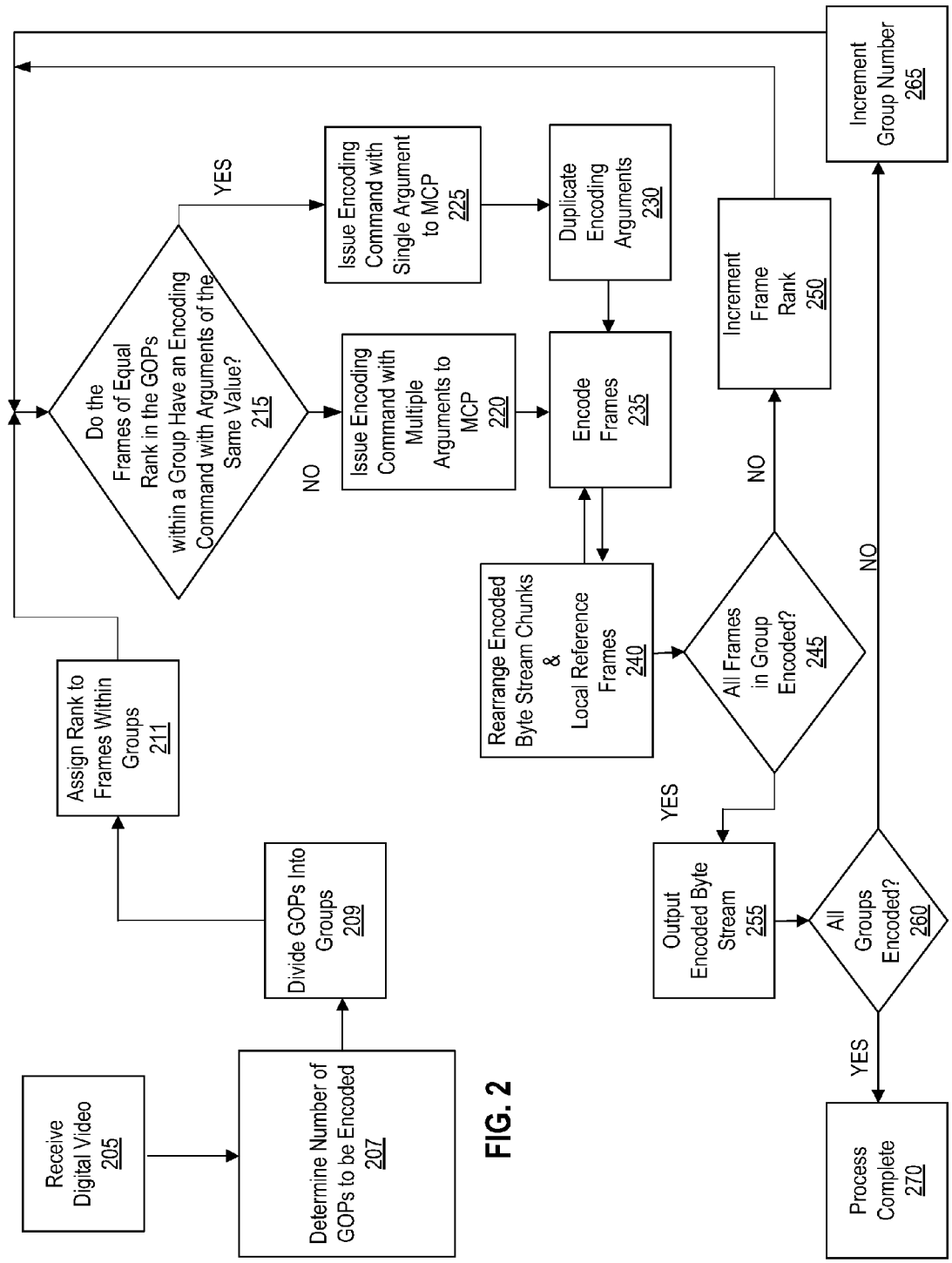
FIG. 2 is a flow chart of an exemplary method for encoding digital video data utilizing parallel processors, consistent with the present disclosure.

FIG. 2 shows an exemplary method for encoding digital video data consistent with the present disclosure. In step 205, a digital video signal is received. In some embodiments, the host memory may be configured as an input buffer for the digital video signal as it is received. For example, the host memory may buffer a streaming digital video signal. Further, host memory may be configured to store the entire digital video signal before encoding occurs.

Figure 3:
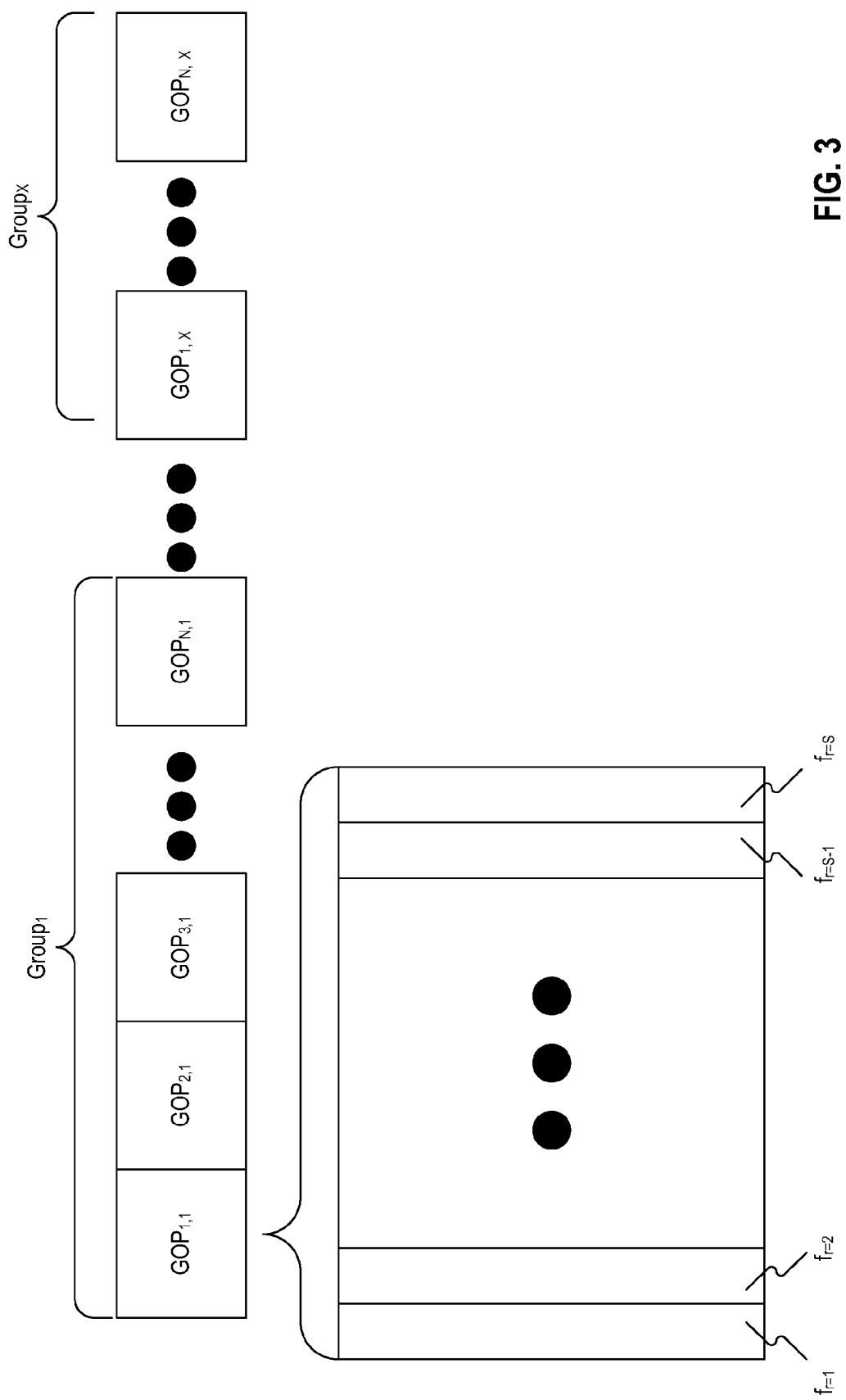
FIG. 3 illustrates video data as represented in groups, groups of pictures, and frames.

The digital video signal is composed a stream of frames divided into groups of pictures (GOPs). In step 207, the number of GOPs to be encoded is determined. In step 209 the GOPs are divided into one or more groups. FIG. 3 illustrates the case where the digital video signal is divided into X number of groups. The number of GOPs in a group, N, may be based on the number of parallel processors in the MCP that are available to perform encoding. The number of parallel processors available to perform encoding may be determined a priori or dynamically. Steps 207 and 209 may be performed, for example, by software operating on the CPU or by hardware.

In step 211, frames within a GOP are associated with, or assigned, a rank r, of 1 to S. FIG. 3 is illustrative of the case where rank is assigned consecutively and sequentially, for example, in $GOP_{1,1}$ frames $f_{r=1}$ to $f_{r=S}$ are depicted. In alternate embodiments, rank may be assigned randomly to frames within a GOP. When rank is assigned randomly to frames within a GOP, frames within other GOPs may also contain the same random rank assignment, such that frames of equal rank among all of the GOPs maintain the same position relative to each other. For example, if the frames of $GOP_{1,1}$ were assigned ranks $f_3, f_5, f_1 \ldots$, then the other GOPs must have similar ranks assigned to their frames. Step 211 may be performed, for example, by software operating on the CPU or by hardware.

The digital video signal is encoded by group. In some embodiments, the groups are processed sequentially. For example, $Group_1$ is processed first, followed by $Group_2$, and so on until all groups are processed. However, in alternate embodiments the groups may be processed in a non-sequential order, until all groups are processed.

In step 215, arguments of an encoding command, for frames of equal rank within a group are compared. An argument may be, for example, frame width, frame height, frame row data, pixel value(s), any other variable related to the frame, or any other variable related to encoding the frame. If the arguments of the encoding command for the frames of equal rank do not possess the same value, an encoding command issues with multiple arguments to the MCP (step 220). For example, if pixel value is the argument being compared, and frames of equal rank within the various GOPs contained in the group have different pixel values, then all of the arguments of the encoding command and all the frames of equal rank within the various GOPs contained in the group are transferred to the MCP. An encoding command containing multiple arguments is then issued and frames for encoding are transferred.

In some embodiments, the transfer of frames of equal rank within the group is accomplished in a single batch by, for example, a single command from the CPU to the MCP. For example, if it is determined in step 215 that all of the frames of equal rank with the GOPs in a group have the same encoding argument value, the CPU may transfer a single argument to the MCP (step 225). If, for example, frame width is the compared argument and all of the frames of equal rank within the GOPs contained in the group have the same frame width, only a single frame width may be transferred to the MCP along with the frames of equal rank. The transferred argument, in this example frame width, may then be duplicated for all the frames of equal rank transferred to the MCP (step 230).

Moreover, in some cases (e.g., the compared frames are identical), only a single frame is transferred to the MCP for encoding. The transferred single frame can be any one of the frames of equal rank compared, because they all have the same value. For example, if all of the frames of r=1 within $Group_1$ have the same value, only one frame of r=1 is transferred to the MCP. Additionally, as illustrated in step 230, the single frame may be duplicated. The number of times the frame is duplicated may be determined by the multi-core platform, host Application, or the user. Collectively, steps 215, 225 and 230 may be referred to as a "broadcast" style communication.

When the frames of equal rank are transferred to the MCP, they may be placed in MCP memory. In step 235, the processors within the MCP encode frames of equal rank contained in MCP memory and output encoded byte stream chunks (encoded frames) and local reference frames. The local reference frames may be used as a reference by the MCP to encode other frames within the group being processed. In some embodiments, the encoded byte stream chunks may be outputted back to the MCP memory, the host memory, or the MCP memory and the host memory. In some embodiments, the local reference frames may be outputted back to the MCP memory, the host memory, or the MCP memory and the host memory.

In some embodiments the frames are encoded in parallel, such that every available processing core within the multi-core platform encodes a single frame. Additionally, in some embodiments, encoding may be accomplished using fewer than the number of cores in the MCP. Additionally, in some embodiments encoding may be accomplished using more than the number of cores in the MCP, because the MCP may be multi-threaded (e.g., the number cores may be increased by virtualization).

In step 240, the encoded byte stream chunks are rearranged into normal display order sequence to create a portion of the encoded byte stream. Because the encoding process may be done in parallel on individual frames from different GOPs, the encoded output from one or more cores may not be in the order of normal display order sequence. Therefore, in order to provide a normal display order sequence, the encoded byte stream chunks are placed in the correct display order.

In step 245, it is determined whether all the frames within the group being processed have been encoded. In some embodiments it is the CPU that makes this determination. In other embodiments (not pictured), it is the MCP that makes this determination.

If all of the frames in a group have not been encoded (step 245), the frame rank is incremented (250) and the method repeats steps 215-240 for the new frame rank. For example, after frames of r=1 are processed, r would be incremented to 2. The frame encoding process would start again at step 215, thereby beginning processing of frames of r=2 within the GOPs in the group being processed.

The MCP memory may act as an output buffer storing the re-arranged encoded byte stream chunks. Additionally, in some embodiments the host memory may act as an output buffer storing the re-arranged byte stream chunks. In some embodiments, the Host (CPU) does the re-arrangement, and the MCP performs steps 220, 225, 230, and 235. In other embodiments (not pictured), the MCP or some other processor may perform the rearrangement.

If all of the frames within the group have been encoded (step 245), the encoded byte stream is outputted from MCP memory (step 255). The outputted encoded byte stream may be, for example, sent to a decoder or display device, sent to communication channels for transmission, or sent to storage for recording. In some embodiments (not pictured), the output of the rearranged byte stream may begin before all frames within the group have been encoded. This may occur so long as the unprocessed frames are encoded and placed in the byte stream before it is their turn to be outputted. In some embodiments (not pictured), the encoded byte stream is output only after all groups have been encoded. In such an embodiment, a complete encoded digital video signal is outputted rather than a single group of the digital video signal.

In step 260, it is determined whether all the groups which comprise the digital video signal have been encoded. In some embodiments, it is the CPU that makes this determination. In other embodiments (not pictured), it is the MCP that makes this determination. If all of the groups have not been processed, in step 265 the group is incremented (e.g., from $Group_1$ to $Group_2$) and $Group_2$ is processed at step 215. When all of the groups are processed, the encoding of the digital video signal is complete (step 270).

Methods described herein may be implemented in software on one or more computing systems. For example, such components may comprise one or more software applications, which may comprise one or more computer units including storage devices containing computer-readable instructions which, when executed by a processor, cause a computer to perform steps of a method. Computer-readable instructions may be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods may be implemented in hardware components or combinations of hardware and software such as, for example, ASICs, special purpose computers, or general purpose computers.

GOP Multithreading Algorithm on INTEL's Larrabee MCP

In methods described herein, input video sequences may be equally distributed within a MCP for parallel processing. Equal distribution of frames of equal rank among the MCP processor cores may reduce encoding times. Additionally, as described above, in some embodiments a single command from the CPU may result in multiple data being encoded in the MCP. The single-command multiple-data approach may reduce communication costs when compared against a single-command single-data approach. As also described above, in some embodiments, a single CPU command (host Application side) may result in frames of equal rank within a group being transferred to the MCP (co-processor side) in a single batch and processed in parallel by the plurality of processors internal to the MCP.

Some embodiments described herein operate in accordance with SONY's SFTCDC AVC Encoder Ver. 4.0 Specification (SFTCDC Specification). The SFTCDC Specification describes the parameters and instructions used by the AVC software encoder library APIs (Application Peripheral Interface) to encode video bit-streams conforming to AVC standard—ISO/IEC 14496-10. In some embodiments, the GOP multithreading algorithm may be performed on a MCP, such as INTEL's Larrabee multi-core platform (L-MCP). However, it will be understood by one of skill in the art that MCPs by other manufacturers with similar features may also be used. In an exemplary embodiment using an L-MCP, the L-MCP executes the encoding process through the API commands of SFTCDC Specification. For example, a single command from a host application to the L-MCP may initiate the encoding process. Additionally, API function calls and data communication between the host application and the L-MCP may be implemented by XN APIs of L-MCP Native. These XN APIs provide mechanisms for loading various thread pool services, for example, L-MCP Native executable, communication between the host and L-MCP, and data transfer between the host and L-MCP.

In exemplary embodiments consistent with the present disclosure, several types of GOPs may be encoded using a GOP multithreading algorithm. One type (type 1) of GOP occurs when a GOP is bounded by two I-frames. A second type (type 2) of GOP occurs when the input frames are evenly distributed among the MCP. The relationship between the GOP being encoded, frames, and the encoding cores varies depending on which type of GOP is being processed.

For example, suppose N is the number of cores in MCP 130, M is the number of input frames, and S is the number of frames (GOP size) between two I-frames. The relationship between the GOPs and the MCP core number is as follows:

| GOP No. | Frame No. | MCP Core No. |
|---|---|---|
| Type 1: | | |
| 0 | 0, 1 ... (S − 1) | 0 |
| 1 | S, S + 1 ... (2S − 1) | 1 |
| 2 | 2S, 2S + 1 ... (3S − 1) | 2 |
| ... | ... | ... |
| A − 1 | (A * N)S, (A * N)S + 1 ... (A * N + 1) * S − 1 | A − 1 |
| where A = $\lceil M/(N * S) \rceil$ | | |
| Type 2: | | |
| 0 | 0, N, 2N, 3N, ... | 0 |
| 1 | 1, N + 1, 2N + 1, 3N + 1, ... | 1 |
| 2 | 2, N + 1, 2N + 2, 3N + 2, ... | 2 |
| 3 | 3, N + 3, 2N + 3, 3N + 3, ... | 3 |
| ... | ... | ... |
| N − 1 | (N − 1), N + (N − 1), 2N + (N − 1), 3N + (N − 1), ... | N − 1 |

There are two places in the SFTCDC Specification that may be modified or extended to implement multi-core GOP processing operations using the L-MCP. First, a single-command multiple-data (SCMD) scheme may be implemented in some API function calls using a savce command. SCMD is a SIMD-like method to aggregate multiple data from different GOPs in a single command from the host (i.e. CPU side) to the L-MCP (i.e., co-processor side). Second, the input digital video frames, output byte stream, and local decoded frames have to be re-arranged in order to support GOP style of encoding.

In at least one embodiment, there is only one encoder command (instance) on the host side, and multiple encoder instances on the co-processor side. With this design, the host side may still maintain simplified control flow due to only one encoder instance. In contrast, the co-processor side has multiple encoder instances in run time, to enable the software to match the nature of multi-core architecture. In addition, the communication throughput between host and co-processor side may increase due to aggregation of a large amount of data from multiple GOPs and moving of the data in a single batch.

In some embodiments the commands may be implemented in the computer language C, C++, or some combination thereof. In some embodiments the host side starts the encoding process with a "CAvcEncSample::iRun", and an object, LrbComHost, is constructed. In the LrbComHost constructor, a multi-core platform binary code (context) is downloaded to the L-MCP and the necessary communication buffers are created through XNBuffer.

In some embodiments there are various savce API commands that may be issued from the CPU side to the co-processor side, for example, CAvcEncSample::Encode_Open( ), Encode_Run( ), Encode_Close( ), InputThread( )/InputHandling( ), and OutputThread( )/OutputHandling( ). Depending on the nature of the savce API commands, two kinds of communication style are implemented. The first communication type is the "broadcast" style, wherein the sender of "broadcast" style command sends a command with a single data (e.g., argument, frame, command, etc.), and the receiver may then duplicate the single data. The second communication type is the "vector" style, wherein the sender of "vector" style command sends multiple data with a single command, and the receiver receives multiple data with different values (e.g., steps 215 and 220 of FIG. 2).

In some embodiments the APIs of SFTCDC AVC Encoder Specification include: savceGetFrameForInput( ); savceReadFrame( ); savceFrameEncode( ); savceGetLocalDecodeFrame( ); Byte stream output; and WriteResults( ). The above commands are explained in more detail below.

savceGetFrameForInput( ). In some embodiments, this command is important because the CPU and the L-MCP sometimes may not use the same address space, in such cases the host side and the L-MCP side need to have their own frame buffers.

savceReadFrame( ). This command may be used to get multiple pictures in GOPs. The savceReadFrame command may be extended to support reading multiple pictures from one raw video input file.

savceFrameEncode( ). The FrameEncode command may be extended to support GOP parallel encoding. C2LBUF_D16M is used for Y frame buffer. C2LBUF_D04MB0 is used for Cb frame buffer. C2LBUF_D04MB2 is used for Cr frame buffer. The FrameEncode command is a "vector" style command. Thus, the L-MCP side receives multiple frames as the input of multiple encoders in one single command.

savceGetLocalDecodeFrame( ). Similar to the savceFrameEncode command, the savceGetLocalDecodedFrame in OutputHandling( ) uses a similar style to get multiple local decoded frames from multiple encoders in the L-MCP.

Byte stream output uses a "vector" style command but with L2CBUF_D08M buffer.

WriteResults( ) is modified to support re-arrange output byte stream and local decoded frame. In addition to original output "yuv" and "avc" files, one additional set of "yuv" and "avc" files (Id.yuv and bs.avc) are created so that original output "yuv" and "avc" files reflect the GOP encoding output without re-arrangement, and the new "Id.yuv" and "bs.avc" are the output after re-arrangement.

In some embodiments, increased processing speed may be associated with an increase in the number of cores available for encoding in the multi-core platform. The methodology described herein can be implemented on any number of cores. Moreover, the software design of the encoding methodology allows for easy portability between different types of hardware platforms.

For purposes of explanation only, certain aspects and embodiments are described herein with reference to the components illustrated in FIG. 1. The functionality of the illustrated components may overlap, however, and may be present in a fewer or greater number of elements and components. For example, all or part of the functionality of the illustrated elements may co-exist or be distributed among several different devices and/or at geographically-dispersed locations. Moreover, embodiments, features, aspects and principles of the presently-claimed inventions may be implemented in various environments and are not limited to the illustrated environments.

Further, the sequences of events described in FIG. 2 is exemplary and not intended to be limiting. Thus, other method steps may be used, and even with the methods depicted in these figures, the particular order of events may vary without departing from the scope of the present inventions. Moreover, certain steps may not be present and additional steps may be implemented. Also, the processes described herein are not inherently related to any particular apparatus and may be implemented by any suitable combination of components.

Other embodiments of the inventions will be apparent to those skilled in the art from consideration of the specification and practice of the inventions disclosed herein. It is intended that the specification and examples be considered as exemplary only, with a true scope and spirit of the inventions being indicated by the following claims.

What is claimed is:

1. A method of generating a compressed video signal in an encoding system comprising a central processing unit (CPU), a host memory, and a multi-core platform comprising a plurality of parallel processor units, the method comprising:
  receiving an input digital video signal comprising a plurality of GOPs each comprising one or more frames;
  determining, by the CPU, a number of GOPs to encode;
  dividing the GOPs to be encoded into one or more groups based on a number of the parallel processor units;
  assigning ranks to the frames in the GOPs;
  comparing arguments of an encoding command for frames of equal rank within a group of the one or more groups, wherein the arguments include image information;
  if the arguments are different from one another, transferring the arguments and the frames of equal rank to the multi-core platform;
  encoding the transferred frames in parallel by the parallel processor units, creating encoded byte stream chunks;
  re-arranging the encoded byte stream chunks in an output buffer in display order sequence to create an encoded byte stream; and
  outputting the encoded byte stream.

2. The method of claim 1, further comprising:
if the arguments of the encoding command for all frames of equal rank are the same,
transferring at least one frame and a single argument to the multi-core platform, and
providing the single argument to each parallel processor unit in the multi-core platform.

3. The method of claim 1, wherein outputting the encoded byte stream occurs after all frames in the group have been encoded and the encoded byte stream chunks arranged in display order sequence.

4. The method of claim 1, further comprising loading, by a host application, at least a part of an encoder library into a memory associated with the parallel processor units, such that the encoding process is executed through a single API command provided by the host application.

5. The method of claim 2, wherein transferring at least one frame and a single argument to the multi-core platform, and providing the single argument to each parallel processor unit in the multi-core platform is performed by executing a single command to transfer the frames in a single batch to the parallel processor units.

6. A non-transitory computer-readable storage medium storing encoding instructions which, when executed in an encoding system comprising a central processing unit (CPU), a host memory, and a multi-core platform comprising a plurality of parallel processor units, cause the encoding system to perform actions comprising:
receiving an input digital video signal comprising a plurality of GOPs each comprising one or more frames;
determining, by the CPU, a number of GOPs to encode;
dividing the GOPs to be encoded into one or more groups based on a number of the parallel processor units;
assigning ranks to the frames in the GOPs;
comparing arguments of an encoding command for frames of equal rank within a group of the one or more groups, wherein the arguments include frame variables;
if the arguments are different from one another, transferring the arguments and the frames of equal rank to the multi-core platform;
encoding the transferred frames in parallel by the parallel processor units, creating encoded byte stream chunks;
re-arranging the encoded byte stream chunks in an output buffer in display order sequence to create an encoded byte stream; and
outputting the encoded byte stream.

7. The computer-readable storage medium of claim 6, further comprising:
if the arguments of the encoding command for all frames of equal rank are the same,
transferring at least one frame and a single argument to the multi-core platform, and
providing the single argument to each parallel processor unit in the multi-core platform.

8. The computer-readable storage medium of claim 6, wherein outputting the encoded byte stream occurs after all frames in the group have been encoded and the encoded byte stream chunks arranged in display order sequence.

9. The computer-readable storage medium of claim 6, wherein the actions comprise loading, by a host application, at least a part of an encoder library into a memory associated with the parallel processor units, such that the encoding process is executed through a single API command provided by the host application.

10. The computer-readable storage medium of claim 6, wherein transferring of the frames in the single batch to the parallel processor units occurs via a single command from the central processing unit to the parallel processor units.

11. A system for encoding a digital video signal, comprising:
a host memory, configured to receive the digital video signal, wherein the digital video signal comprises a plurality of GOPs and the GOPs comprise one or more frames;
a central processing unit, configured to:
divide the GOPs to be encoded into one or more groups,
compare arguments of an encoding command, for frames of equal rank within a group of the one or more groups, wherein the arguments include at least one of frame width, frame height, frame row data and pixel values,
if the compared arguments have the same value,
transfer, a single argument and at least one of the frames of equal rank within the group, and
if the compared arguments have different values,
transfer, the arguments and the frames of equal rank within the group; and
a multi-core platform comprising:
a plurality of parallel processor units configured to:
receive, from the central processing unit, frames of equal rank from the group and at least one argument,
if only a single argument is received,
provide the single argument to each of the of parallel processor units, encode the frames in parallel, creating encoded byte stream chunks, arrange the encoded byte stream chunks in display order sequence to create an encoded byte stream, and
output the encoded byte stream; and
a multi-core platform memory, configured to store frames transferred from the central processing unit, and further configured to store encoded byte stream chunks.

12. The system of claim 11, wherein the central processing unit is further configured to transfer, with a single command, frames of equal rank from each GOP in the group, in a single batch, to the parallel processor units.

* * * * *